United States Patent [19]
Jacober et al.

[11] Patent Number: 6,020,886
[45] Date of Patent: *Feb. 1, 2000

[54] METHOD AND APPARATUS FOR GENERATING ANIMATED HELP DEMONSTRATIONS

[75] Inventors: Mark H. Jacober, Beverly; Jennifer L. Pinkus, Milton, both of Mass.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/708,390

[22] Filed: Sep. 4, 1996

[51] Int. Cl.⁷ ..................................................... G06F 17/30
[52] U.S. Cl. .......................... 345/338; 434/118; 345/333; 345/334; 345/336
[58] Field of Search ..................................... 345/326, 336, 345/337, 338; 434/118

[56] References Cited

U.S. PATENT DOCUMENTS

| | | | |
|---|---|---|---|
| 5,261,820 | 11/1993 | Slye et al. | 434/118 |
| 5,388,993 | 2/1995 | McKiel et al. | 434/118 |
| 5,395,243 | 3/1995 | Lubin et al. | 434/118 |
| 5,481,667 | 1/1996 | Bieniek et al. | 345/338 |
| 5,483,632 | 1/1996 | Kuwamoto et al. | 345/338 |
| 5,577,186 | 11/1996 | Mann, II et al. | 345/340 X |
| 5,602,982 | 2/1997 | Judd et al. | 345/326 |
| 5,627,958 | 5/1997 | Potts et al. | 345/336 |
| 5,745,738 | 4/1998 | Ricard | 434/118 |

*Primary Examiner*—Raymond J. Bayerl
*Assistant Examiner*—Chadwick A. Jackson
*Attorney, Agent, or Firm*—Kudirka & Jobse, LLP

[57] ABSTRACT

A help demonstration player program is provided which accepts a set of commands in the form of a script input and generates simulated keystrokes and mouse events. The keystrokes and mouse events are provided to the application program which then operates as if the user had generated the keystrokes and mouse events. The sequence of keystrokes and mouse events directs the application software to perform a task one step at a time. Since the task starts with the user's customized screen and detects and responds to the state of the user's desktop through the demonstration, the resulting animated display is tailored to the user's actual display, presenting much more meaningful and less confusing instructions to the user. The demonstration player creates sample data so that the user's actual data is not corrupted during the playing of the explanatory sequence and user control over the keyboard and mouse is disabled to prevent the user from interfering with the demonstration. The text from conventional help screens may also be displayed on the screen during the demonstration in order to further assist the user.

31 Claims, 14 Drawing Sheets

METHOD AND APPARATUS FOR GENERATING ANIMATED HELP DEMONSTRATIONS

FIELD OF THE INVENTION

This invention relates to computer systems in general and, in particular, to animated help demonstrations which guide a user through the steps involved in using a particular feature in a software application program.

BACKGROUND OF THE INVENTION

Early versions of many popular software application programs were "command line oriented." These programs displayed a prompt on a display screen and required the user to enter a command word from a keyboard. The command was specific to the application program and was typically in an unfamiliar language. Further, the command often required additional parameters to be entered in order to control the application program to perform a particular function. These applications were often difficult to use and very difficult to learn since the user had to learn the large set of commands which were specific to the particular application program. The commands were often not intuitive in their operation.

Later versions of programs used particular keystrokes or combinations of keystrokes to control the program. For example, a program might use "function" keys or combinations of function keys to perform specific operations. However, some programs had a large number of functions, and, accordingly, many keystroke combinations had to be learned by the user, again making a difficult task of learning to use the program.

The use of graphical user interfaces greatly reduced the learning time of many programs and made the task of learning to use such a program much less daunting. When using a graphical user interface, graphic images are displayed on a screen. The images can represent entire operations or steps in an operation. These images can include icons, buttons and other controls which are drawn on the screen by the application program. The user manipulates the graphic images by selecting an image by means of a pointing device, such as a mouse, and then performing another operation such as clicking a mouse button. The graphic images can be changed during the operation of the program to represent the current program operation. Consequently, users do not have to memorize a large set of commands or keystroke combinations.

However, even as application programs became easier to use, they were also becoming more and more complex with additional complicated features that often have a sequence of different steps which require manipulating a sequence of graphic images to perform a particular function. Consequently, users still have problems in remembering the correct sequence of steps to perform a given operation. Accordingly, it has been common practice to include "online" help systems in such programs. These help systems were originally textual descriptions of the steps involved in a particular procedure. The text was displayed on the screen when requested by the user. Some on-line help systems were context driven in that the specific text which appeared when requested by the user was related to the operation which was being performed.

Such text-based systems worked well in character-based environments. However, in programs with graphical user interfaces, text based help systems fail to provide users with the information that helps them learn how to use the program in the best manner. In particular, with text based help systems, it is often difficult to describe areas of the screen, and particular graphic images in order to effectively identify these items. Therefore, it is often necessary to give graphic images names, thereby defeating the purpose of using a graphic image in the first place.

Accordingly, many online help systems have changed to a hybrid text and graphic system in which graphic images of particular icons and buttons are included in the help window rather than a textual description of these items. In other systems, an image of a portion of the display screen is provided. The image has "hot spots" which can be selected by a user. When a hot spot is selected, a textual description of the selected area appears. In this manner, a user can more easily identify the items on the screen.

However, such systems still provide very limited help to the user as it is often not obvious in which sequence to operate controls during a particular operation. Further, it is also sometimes difficult to describe how to manipulate the control, for example, whether the control should be clicked, double-clicked or dragged.

Accordingly, demonstration systems have been developed which generate an animated display of a set of procedural steps so that the user can watch the steps being performed on the screen. Traditionally, these animated demonstrations or demos have been produced by generating a set of bitmap images of the display screen with one image for each step in the operation. Sometimes, several images are used to demonstrate a single step. One of the problems with such animated demonstrations is that many graphical user interfaces can be highly customized by the user. Typically, the bitmapped images which comprise the animated demonstration are generated with the system shown in a particular standard configuration. If the user's configuration differs considerably than the standard configuration, it may confusing to the user to determine where icons or buttons are located on his customized screen. In addition, the sequence of steps shown in the animated demonstration may have to be changed so that the sequence of steps corresponds to the user's actual screen display.

Another problem with all of the traditional animated help demonstrations is that the bitmapped graphics must be redone if the product is to be "localized" or customized for a particular country. Generally, screen images include some text which must be translated into a local language. Often the graphic images are arranged in standardized layouts for a particular country. When an animated demonstration is localized, the text present on the screen must first be translated and then the bitmapped graphics must be regenerated with the translated text.

Accordingly, there is a need for a mechanism for generating animated help demonstrations which generates demonstrations with the user's customized screen display.

There is a further need for a mechanism for generating animated help demonstrations which can be quickly localized.

There is still a further need for a mechanism for generating animated help demonstrations which can be easily and quickly used.

SUMMARY OF THE INVENTION

In accordance with one embodiment of the invention, a help demonstration player program is provided which accepts a set of commands in the form of a script input and generates simulated keystrokes and mouse events. The keystrokes and mouse events are provided to the application program which then operates as if the user had generated the keystrokes and mouse events. The sequence of keystrokes and mouse events directs the application software to perform a task one step at a time. Since the task starts with the user's customized screen and the demonstration player can detect and respond to the customized state of the user's screen at all times, the resulting animated display is tailored to the user and thus is more meaningful and much less confusing to the user. The demonstration player creates sample data so that the user's actual data is not corrupted during the playing of the explanatory sequence and user control over the keyboard and mouse is disabled to prevent the user from interfering with the demonstration. The text from conventional help screens may also be displayed on the screen during the demonstration in order to further assist the user. This text can be displayed in "bubbles" that are positioned appropriately as determined by the results of a query made to the application program. For example, the text "Click the File Save Button" would be displayed in a bubble positioned next to an image of the File Save button.

The demonstration player runs as a separate process from the application program. The player interfaces with an application program by using a function built into each application program which returns the location of particular objects on the display screen. Since each step of the demonstration consists of determining where the object of interest is located, moving the mouse pointer to that location and issuing a mouse event or a keyboard event, very little of the demonstration needs to be localized. Any text which is displayed on the screen is typically the same as generated by the conventional textual help system. Consequently, when the help system is translated for a particular country, the translated text can also be used in the demonstration.

The demonstration player begins with the user's customized desktop configuration so that it can provide customized configuration sensitive help. For example, if an object being queried is not visible on the user's screen, the demonstration can respond by teaching a procedure that either does not use the invisible object or makes the object visible before using it. The demonstration player also includes error checking code in order to recover from situations where a user's desktop is not in a particular configuration that can be easily used by the demonstration player. For example, if a dialog box is open on the user's screen when a demonstration is started, it might have to be closed so that it would not obscure the demonstration. However, simply closing the dialog box might cause loss of data which the user had entered. In this case, the demonstration player would contain code which detected the existence of the dialog box and instructed the user to close the dialog box before starting the demonstration. In addition, since the script driving the demonstration player is uniform, it can be used across many hardware platforms.

DETAILED DESCRIPTION OF A PREFERRED EMBODIMENT OF THE INVENTION

Figure 1:
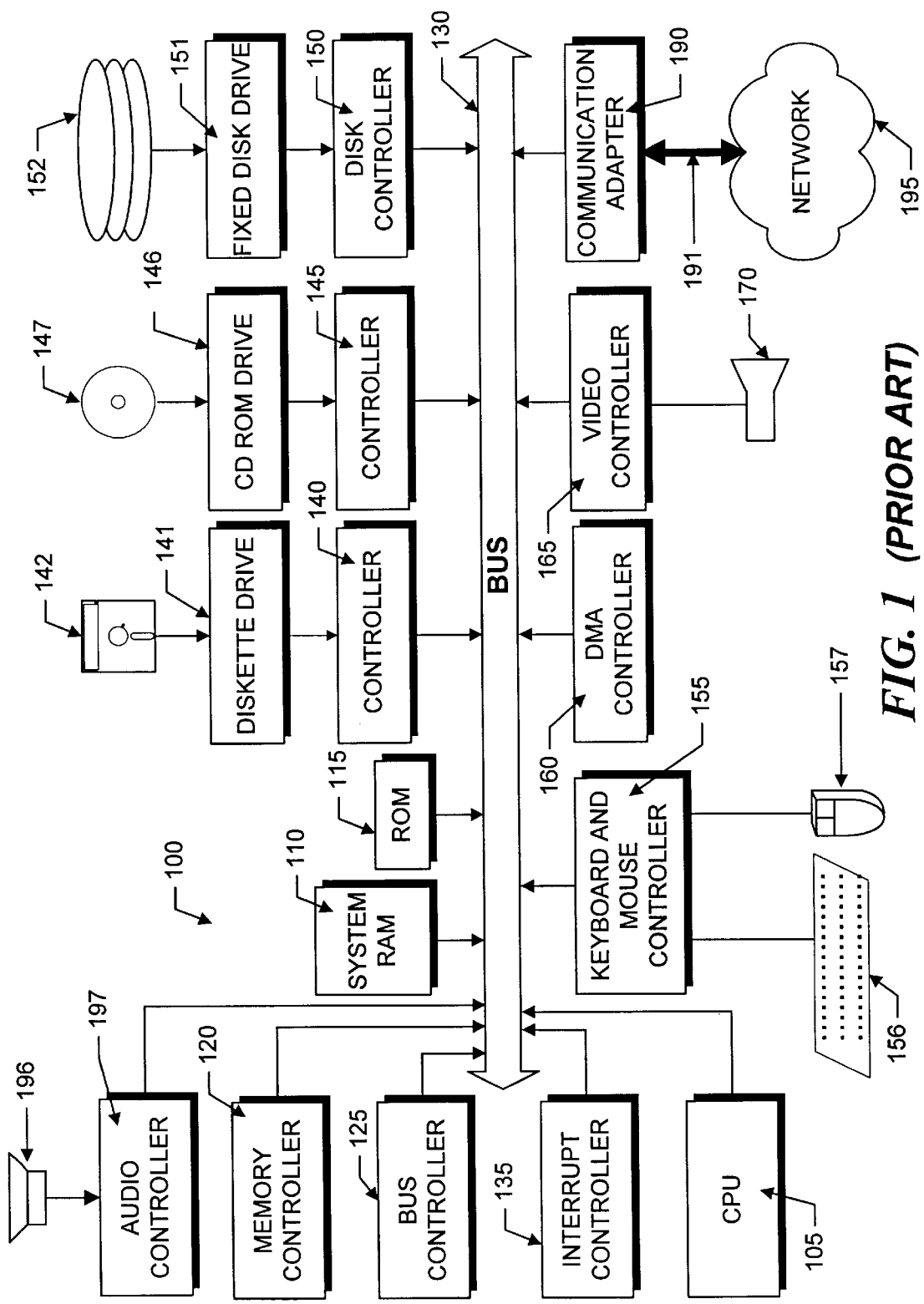
FIG. 1 is a block schematic diagram of an illustrative computer system on which the present invention can be run.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Non-volatile mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the WINDOWS® 95 operating system, sold by Microsoft Corporation, Redmond, Wash. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2®, UNIX and DOS, etc.

In addition to the operating system, other software components operating on computer system 100 include an illustrative application program and a demonstration player program constructed in accordance with the principles of this invention as well as other system components with which the application program interacts.

Figure 2:
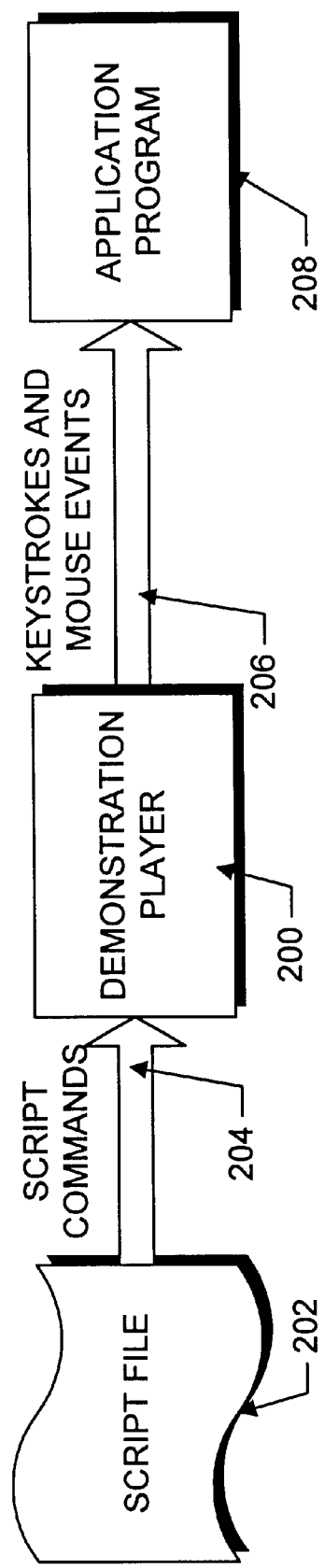
FIG. 2 is a schematic diagram illustrating how the demonstration player controls an application program from commands in a script file.

FIG. 2 illustrates how the inventive demonstration player program 200 operates by controlling an application program 208 in the same manner that a user would control the program. The demonstration player program 200 reads a script file 202 to retrieve a sequence of demonstration commands indicated by arrow 204. A script file 202 is written for each feature or operation which is to be demonstrated so that the sequence 204 of demonstration commands is tailored for a particular demonstration. In order to simplify the composition of the script file, the demonstration commands correspond to a complete action such as moving the mouse pointer to a specified location on the display screen. The script file can be written in a variety of languages, but a preferred language is LotusScript developed by the Lotus Development Corp., 55 Cambridge Parkway, Cambridge, Mass. 02142.

In response to each demonstration command in the command sequence 204, the demonstration player 200, parses the command and then generates one or more input commands such as those that would be generated by the user. The parsing of the demonstration command and the generation of the input commands is performed in a conventional fashion. These commands would include keystrokes and mouse events 206. These input commands are applied to the application program and control it in the same manner as if the input commands had been generated by the user. For example, the demonstration player might respond to the demonstration commands by moving the mouse pointer to a desired 'object' or graphic image on the display screen (such as an icon, an edit box, a location on a drawing surface, a position in a body of text). The demonstration player 200 then selects or operates the object using either mouse clicks or keypresses.

In order to operate in this fashion, the demonstration player 200, under control of the script file 202, must acquire two basic information items about each object: its location on the desktop screen and the object window handle. Once this information is known, the demonstration player 200 can issue input commands to move the mouse pointer to the specified location and issue mouse events (mouse up's and down's, double clicks, and moves) and keyboard events (sending characters) to the appropriate window.

To learn the screen location of an object and it window handle, the script file 202 includes a call to an application program function named "WhereIs( )" which returns the desired location information for every object in the product which can be controlled by commands issued by the demonstration player 200. The WhereIs( ) function must be implemented in every application program to enable the inventive animated help demonstration system.

Figure 3:
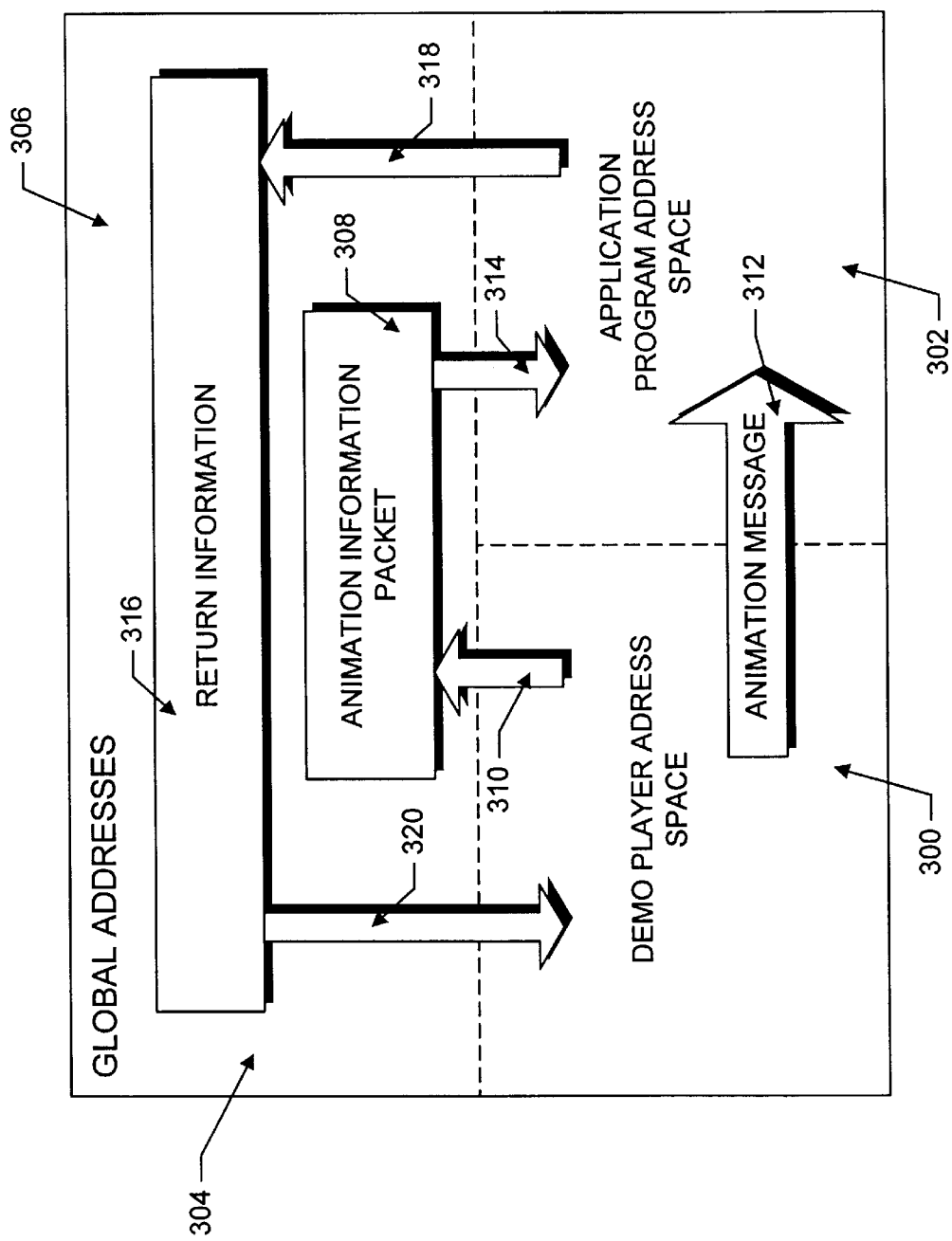
FIG. 3 is a block schematic diagram illustrating communication between the demonstration player and the application program by means of global memory locations.

In accordance with the principles of the invention, the demonstration player program 200 is a shared component that runs in a separate process from the application program 208 as illustrated in FIG. 3. The demonstration player 200 runs in an address space 300 and the application program 208 runs in an application address space 302. To communicate with the application program 208, the demonstration player 200 allocates a global data structure 308 in global address space 306 for passing data to, and receiving data, from the application program 208. This structure 308 is called an "animation information packet". The animation information packet can also be implemented as a mapped memory file.

Figure 4:
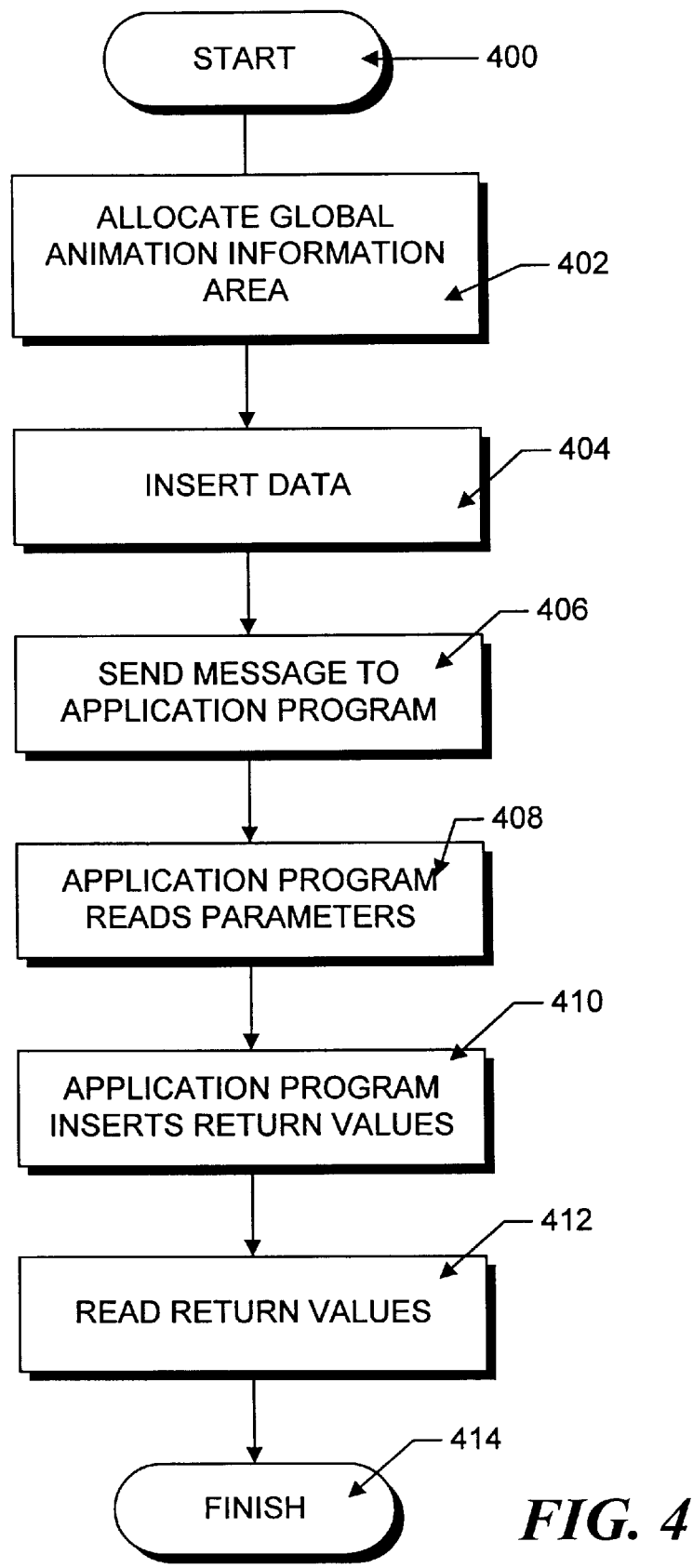
FIG. 4 is a flowchart illustrating the process of data exchange between the demonstration player and the application program.

The sequence of operations involved in passing information between the demonstration player program 200 and the application program 208 is illustrated by the arrows in FIG. 3 and the steps in the flowchart shown in FIG. 4. As illustrated in FIG. 4, the information transfer routine starts in step 400 and proceeds to step 402 in which a data structure 308 (discussed in more detail below is allocated in the global address space. In step 404, the demonstration player inserts arguments into the data structure 308 in order to inform the application program of the desired information. This step is indicated as arrow 310 in FIG. 3. Next, as illustrated in step 404 and arrow 312, a registered animation message (called WM_ANIM) is sent by the demonstration player to the application program to inform the application program that information is being requested. This message includes a parameter which indicates the information desired or issues a command. The parameters might, for example, include the a parameter indicating that the demonstration player is making a WhereIs( ) function call or the parameter may indicate a command such as Open Sample File, Set Target Window, Close Sample File, Run Script Command or End Demo. The operation of the WhereIs( ) function and the response of the application program to each of the commands is discussed in more detail below.

In response to a WhereIs( ) function call, the application program 208 reads the animation information from the animation information packet 308 as indicated by arrow 314 and step 408. The application program 208 then determines the requested values and places return information into a return information structure 316 as indicated by arrow 318 and step 410. The demonstration player program next reads the information in the return information data structure 316 as indicated by arrow 320 and step 412. The information transfer routine ends in step 414.

Figure 5:
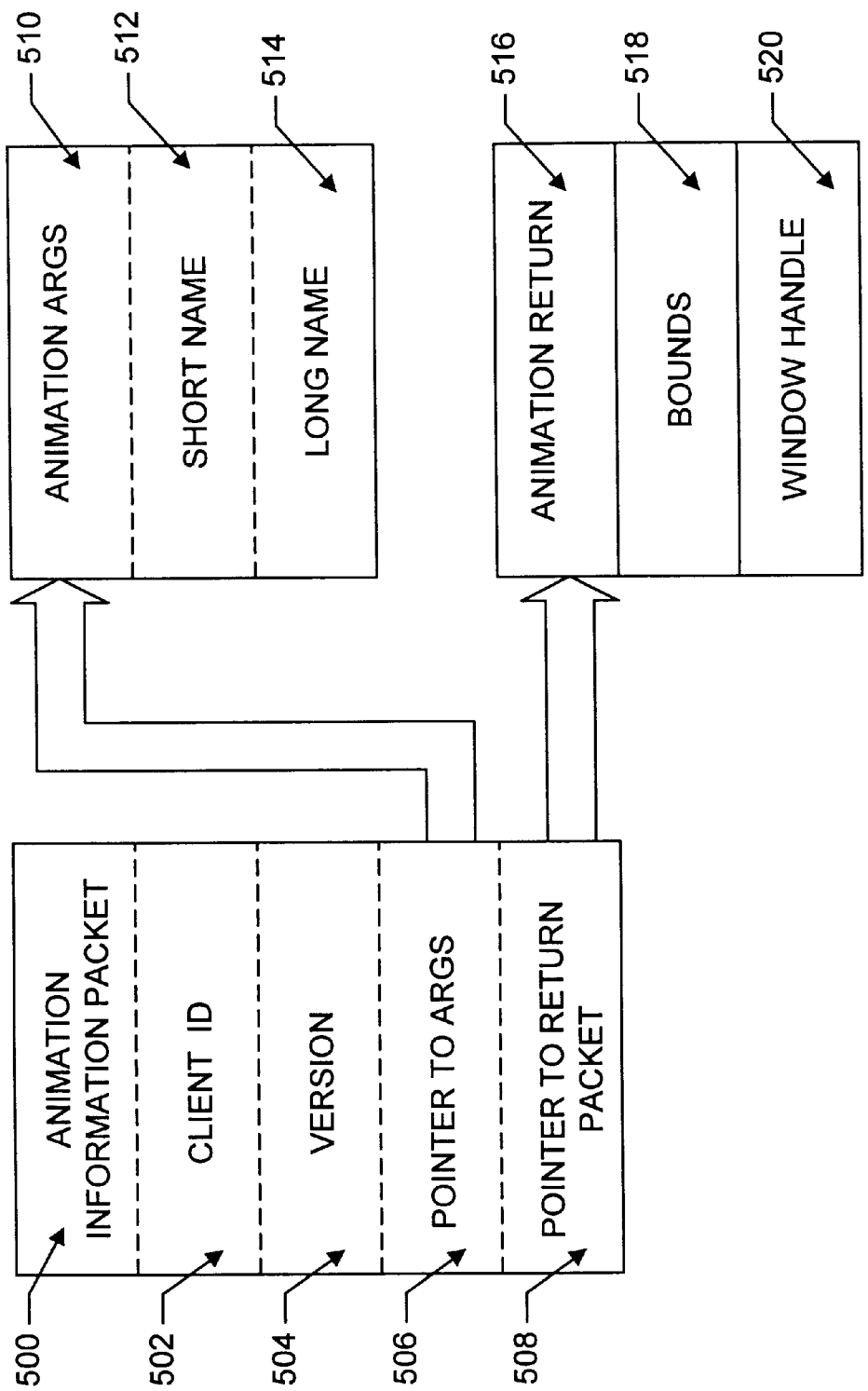
FIG. 5 is a schematic diagram of data structures used to pass information between the demonstration player and the application program.

FIG. 5 shows the animation information packet 500 in more detail. The animation information packet 500 is a data structure that contains information required to handle each message and fields for return information, if required. This structure is defined as follows (the definition is shown in the C programming language. Other languages could also be used without departing from the spirit and scope of the invention):

```
typedef struct AnimPkt {
        short         ClientID;
        unsigned short   version      // Version no. of this packet;
        PAnimArgsPkt  pAnimArgs       // Pointer to arguments packet;
        PAnimReturnPkt pAnimReturn    // Pointer to return information
} AnimInfoPkt, *PAnimInfoPkt;
```

The ClientID field Indicates the portion of the application program 208 which is responsible for handling the WM_ANIM message 312. The following description assumes that the application program operates in a windowing environment, but other environments can also be used. In a windowing environment, the WM_ANIM message is sent to the application program main window. The message handler for that window checks the ClientID field and decides whether to handle the message or pass it on to a sub or child window. For example, the application program main window might pass the message on to a chart window, a status bar, an infobox control or a "smart" icon. These latter windows will then handle the message. The ClientID field indicates that type of control to which the message is addressed.

The version number 504 is used to insure that an application program can respond to a particular animation packet. For example, newer version application programs may not be able to respond to animation packets generated by older demonstration player programs. The version number can be used to insure proper interpretation by the application program. For example, the version number can be updated when any structure in the animation information packet changes after an application program is shipped with help demonstrations. Any application program with a particular version number will be able to handle packets of that version or greater. (i.e. changes to the structure will always be backward compatible.)

The animation information packet also includes a pointer 506 to a data structure 510 which contains arguments for the message. This argument structure 510 contains a superset of arguments needed for all the messages. It might for example contain a short name field 512 and a long name field 514. If a particular application program needs more fields to name complex objects, those fields can be added to the end of the structure 510.

A second pointer 508 is also provided to another data structure which contains information returned from the application program in response to a WhereIs(0 function call. This structure 516 contains bounds information indicating the location of a selected object and a window handle field which holds the window handle of the identified object. If the object does not exist or is not visible, then the application program sets the window handle to null.

Figure 6:
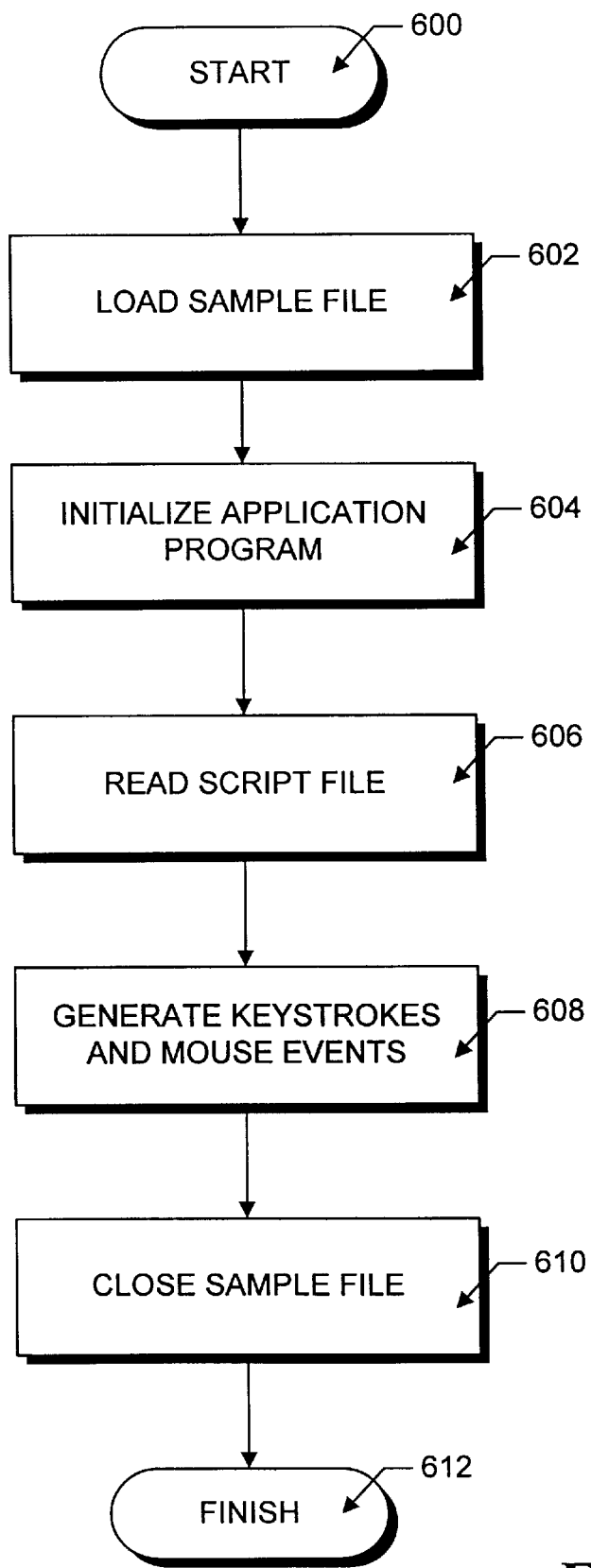
FIG. 6 is a flowchart illustrating the steps involved in running an animated demonstration.

FIG. 6 is a flowchart illustrating the steps involved in generating an animated help demonstration. As mentioned above, a specific routine is chosen by the user to demonstration a particular feature or operation. The routine starts in step 600 in which the demonstration player program is started. The routine proceeds to step 602 in which a message is sent by the demonstration player program to the application program to cause the application program to load a sample data file. Sample data is used to prevent the demonstration player from corrupting the user's actual data. An Open Sample File message is used to open the sample file. Before sending the Open Sample File message, the demonstration player places a localized file name (with or without an extension) in the Long Name field 514 of the argument data structure 510. Generally, this file name would be specific to the demonstration and would be part of an initialization subroutine in the script file which controls the demonstration. This information is transferred to the application program by the process described above. In response, the application program opens the file with the specified name. This message is typically handled by the main application program and is not passed to any of the subsystems. There are no return values for this message.

Next, the demonstration player program initializes the application program. The initialization includes disabling the user's mouse and keyboard so that the user will not interfere with the demonstration. In addition, some initial screen manipulation may be done. This may be necessary because the application program may be in such a state that the demonstration program may operate with an error or the demonstration display may be obscured. For example, some application programs have "modeless" screens which can be open on the desktop. These screens can be open while normal operation of the application program continues. They may be in a position such that they will obscure graphics drawn on the screen or objects dragged to that point. The demonstration player program can be designed to detect the presence of these screens and close them. Generally, the demonstration player program will try to "clean" the display screen as much as possible before proceeding with the demonstration. The demonstration player program contains code to clean up general situations which affect all demonstrations, whereas each specific demonstration may have particular clean up problems. These particular problems are handled by code in the script file.

One method of handling initialization is by a Run Script command message. This latter message allows the demonstration player program to run any script programs written for the application program. For example, the Run Script command message could be used to turn off visible bookmarks or to display a status bar. The script command string to be executed is passed in the long name field 514 of the animation arguments data structure 510. Any data returned by the execution of the script command can be passed back in animation return data structure 516.

Next, in step 606, each step in the script file is read and decoded to generate input commands for controlling the application program. A sample script file is illustrated below. The sample script file generates an animated demonstration which teaches a user how to create a cell comment for a spreadsheet cell and each step in the demonstration is represented by a Select Case statement set.

SCRIPT FILE FOR CREATING A SPREADSHEET CELL COMMENT

```
Sub Initialize
    ClientMainWinClass = GEMINI_MAINWINCLASS
    ClientID = AN_GEMINI
    ClientModName = GEMINI_PERSMODNAME
    ClientLotusAppID = "GEMINI"
    ShowMeModName = "020"
    AnimVersionNum = 2.24
    NumFramesThisAnim = 9
    AnimationType = "QuickDemo"
    SampleFile = "demo2.123"
    AnimName = GetString("0200000", IResult%)
End Sub
Public Sub ShowMe (theNextStep As Integer)
    GetCursorPos TempPos
    CursorPosForStep(theNextStep) = TempPos
    Select Case theNextStep
    Case 1
```

SCRIPT FILE FOR CREATING A SPREADSHEET CELL COMMENT

```
    'Retrieve text for step 1 ("Click the cell.") from a resource file.
    'Keeping text isolated from the demo greatly reduces
    'translation costs: only the text needs to be translated
    not the demo!
    StepsText = GetString( "0201001", IResult%)
    'Ask product "where is" screen location of cell E4 (5,4) . . .
    X =    SetTargetWindow (ToolWin_G, "demo2.123", ClientID,
           DeskwHdl.val)
    X = DoWhereIs (CELL_OBJ_G "",5,4,0,0,ClientID)
    'Display the text bubble with text "Click the cell." over
    cell E4 . . .
    ShowTextBubble StepsText, .5, .5, NorthEast
    HideTextBubble
    'Move the mouse pointer to the center of cell E4 . . .
    MoveToObj Center
    'Click cell E4 to select it . . .
    DoMouse WM_LBUTTONDOWN%, 0
    DoMouse WM_LBUTTONUP%, 0
    Exit Sub
Case 2
    StepsText = GetString("0201002", IResult%)
    SetBubblePosforMenus
    ShowTextBubble Steps Text, .5, .5, NorthEast
    HideTextBubble
    'Select menu item Range - Cell Comment
    ChooseMenuItem ShCellComment_g
    Exit Sub
Case 3
    'Ask 1-2-3 "where is" system menu control on
    Properties box . . .
    WhereIsIBControl IBCISYSMENU, 1
    'Move the mouse pointer to a position just outside of the
    system menu on
    'the Properties box as a place to grab for dragging . . .
    MoveToObjRel 110, 50
    'Do the mouse down to start the drag . . .
    DoMouse WM_LBUTTONDOWN%, 0
    Exit Sub
Case 4
    'Ask 1-2-3 "where is" cell A2, the target for dragging the
    Properties box . . .
    X =    SetTargetWindow (ToolWin_G "demo2.123", ClientID,
           DeskwHdl.val)
    X = DoWhereIs (CELL_OBJ_G "",1,2,0,0,ClientID)
    MoveToObj Center
    DoMouse WM_LBUTTONUP%, 0
    Exit Sub
Case 5
    StepsText = GetString("0201003", IResult%)
    Delay 500
    'Ask "where is" the "Cell comment" edit field . . .
    WhereIsIBControl IBCICONTROL,
    TRTRGMANIP_PROP_CELLNOTE_G
    'Position the next text bubble just below that edit field . . .
    ShowTextBubble StepsText, .1, 1.1, NorthEast
    HideTextBubble
    Exit Sub
Case 6
    StepsText = GetString("0201004", IResult%)
    Delay 1000
    WhereIsIBControl IBCICONTROL,
    TRTRGMANIP_PROP_CELLNOTE_G
    ShowTextBubble StepsText, 0, 0, NorthEast
    HideTextBubble
    Exit Sub
Case 7
    Delay 500
    'Retrieve the comment text from the resource file and type it
    'in to the comment edit box . . .
    SendTextKeys GetString("0202007",IResult%),50
    Exit Sub
Case 8
    X =    SetTargetWindow (ToolWin_G, "demo2.123", ClientID,
           DeskwHdl.val)
    X = DoWhereIs (CELL_OBJ_G "",1,1,0,0,ClientID)
    MoveToObj Center
    DoMouse WM_LBUTTONDOWN%, 0
    DoMouse WM_LBUTTONUP%, 0
```

SCRIPT FILE FOR CREATING A SPREADSHEET CELL COMMENT

```
    Exit Sub
Case 9
    StepsText = GetString("0201005",IResult%)
    'Ask "where is" the Close box control on the Properties box . . .
    WhereIsIBControl IBCICLOSEBOX, 1
    ShowTextBubble StepsText, .5, .5, NorthEast
    HideTextBubble
    MoveToObj Center
    'Click the Properties box closed . . .
    DoMouse WM_LBUTTONDOWN%, 0
    DoMouse WM_LBUTTONUP%, 0
    Exit Sub
End Select
End Sub
```

The first subroutine is used to initialize the application program as discussed above in order to open the sample file, etc. As illustrated, the second subroutine of the script file consists of sequentially calling Select Case statements which issue WhereIs( ) function calls to locate an object, move the mouse pointer to that object and then manipulate the object.

A WhereIs( ) function call is made by sending a WhereIs( ) message from the demonstration player to the application program using the data transfer arrangement as discussed above. The application program response to the WhereIs( ) message provides the demonstration player with information about a specified application program or shared component control. The return information tells the demonstration player 1) if the control is currently visible on the user's screen and, if it is, 2) where the control is located on the screen.

When the main application window gets a WhereIs( ) message, it checks the ClientID. If the ClientID is it's own, it processes the message itself. It must insert in the return data structure 516 the location information (bounding box coordinates 518 and a window handle 520) for the specified object. The object for which the information is requested is specified by arguments provided in the animation arguments data structure 510.

If the ClientID type indicates a shared component (e.g., an infobox, a status bar or a smarticon), the main application program must call an exported WhereIs function provided by that shared component. The WhereIs function takes a pointer to the animation information packet 500 which provides all necessary information and a place to put the return information. The short name field 512 of the animation arguments structure 510 can be used to identify a shared control by holding the control ID.

In the case of multi-window application programs it may be necessary to identify which window is active. This identification can be performed by issuing a Set Target Window Message. The Set Target Window message is used to activate the destination window for subsequent WhereIs messages. For example, if an animated demonstration was being generated for a copy procedure between documents, the following set of messages would be sent from the demonstration player to the application program:

1. A Set Target Window message to activate the source document window.
2. WhereIs messages to select a range in the source window.
3. WhereIs messages for copy icons.
4. A Set Target Window message to activate the destination document window.
5. WhereIs messages to select the destination within the document window.

The Document window name is provided in the long name field 514 of the animation argument data structure 510. The Set Target Window message is handled by the main application program and is not passed to any of the subsystems. There are no return values for this message.

After a sample file has been opened and the appropriate window has been activated and a control located, the demonstration player issues input commands such as keystrokes and mouse events as illustrated in step 608 to move the mouse pointer to the identified location and manipulate the selected control. The keystrokes and mouse events are entered into the application program I/O buffer so that they are processed as if they were entered by the user.

At the end of the demonstration, the sample data file is closed (step 610) when the demonstration player issues a Close File message. With this message no data is passed and, in response, the application program closes the current sample data file. This message is handled by the main application program and is not passed to any of the subsystems. There are no return values for this message.

The routine ends in step 612. In some cases an EndAnim Message is sent by the demonstration player to the application program. This latter message, which is also sent when the user has chosen to quit the demonstration before its termination, allows the application program to clean up.

The demonstration player may also cause the application program to display explanatory text along with the demonstration animation. Preferably, this text is the same text used for the text-based help screens so that it will be localized by translating the help text screens. As indicated in the sample script file above, this text is extracted from a resource file. In accordance with the principles of the invention, this resource file can contain text extracted from the conventional text based help system or, in some cases, the resource file may be the same resource file used by the text based help system. The text is displayed at a location specified in the script file.

Figure 7:
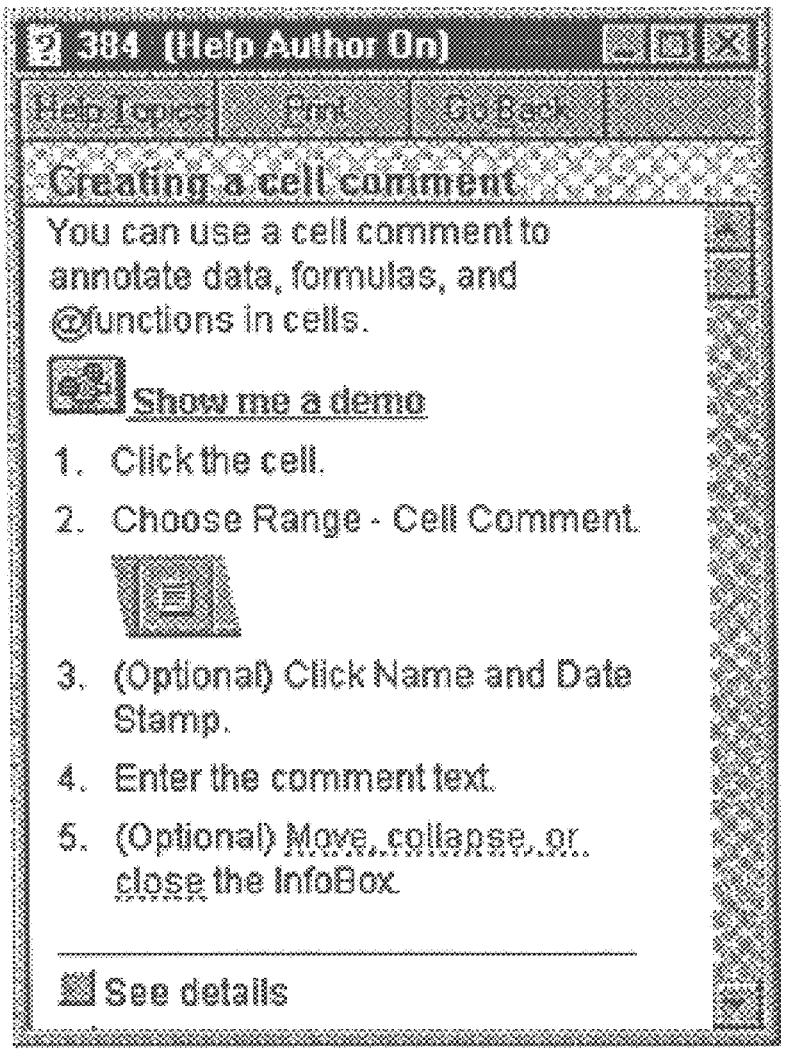
FIG. 7 is a screen shot of a text based help screen for the help topic of creating a cell comment for a spreadsheet program.

FIG. 7 is a screen shot of a conventional text based help system containing the steps, for a help topic concerned with creating a cell comment for a spreadsheet application program. This help topic is the same subject for which the script file listed above generates a demonstration program. As can be seen in FIG. 7, in accordance with the principles of the present invention, the text based help system includes a button with the caption "Show me a Demo." In addition, the help screen contains a set of numbered text statements which correspond to steps which must be performed by the user to create the cell comment.

Figure 8:
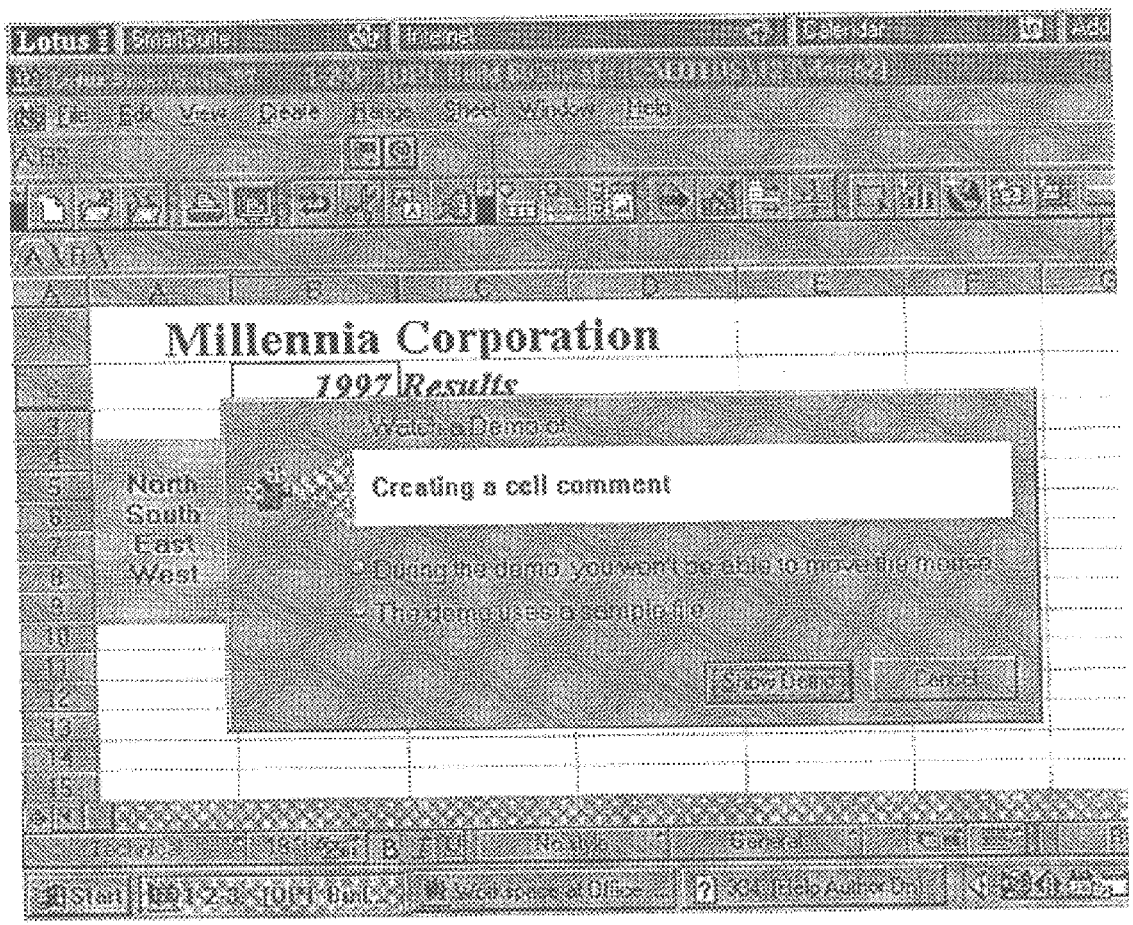
FIG. 8 is a screen shot of one step in a sample animated demonstration program created for the help topic illustrated in FIG. 7.

FIG. 8 shows a screen shot of a screen display generated by the inventive animated help demonstration when the user clicks the "Show me a Demo" button in the text based topic screen. In response, the demonstration player opens a sample data file which is manipulated during the demonstration so that the demonstration does not disturb the user's actual data. Subsequently, the demonstration player displays an opening "splash" screen which informs the user that the mouse will be disabled and that a sample file is used. At this point the user is given the choice to show the demonstration or to cancel the demonstration.

Figure 9:
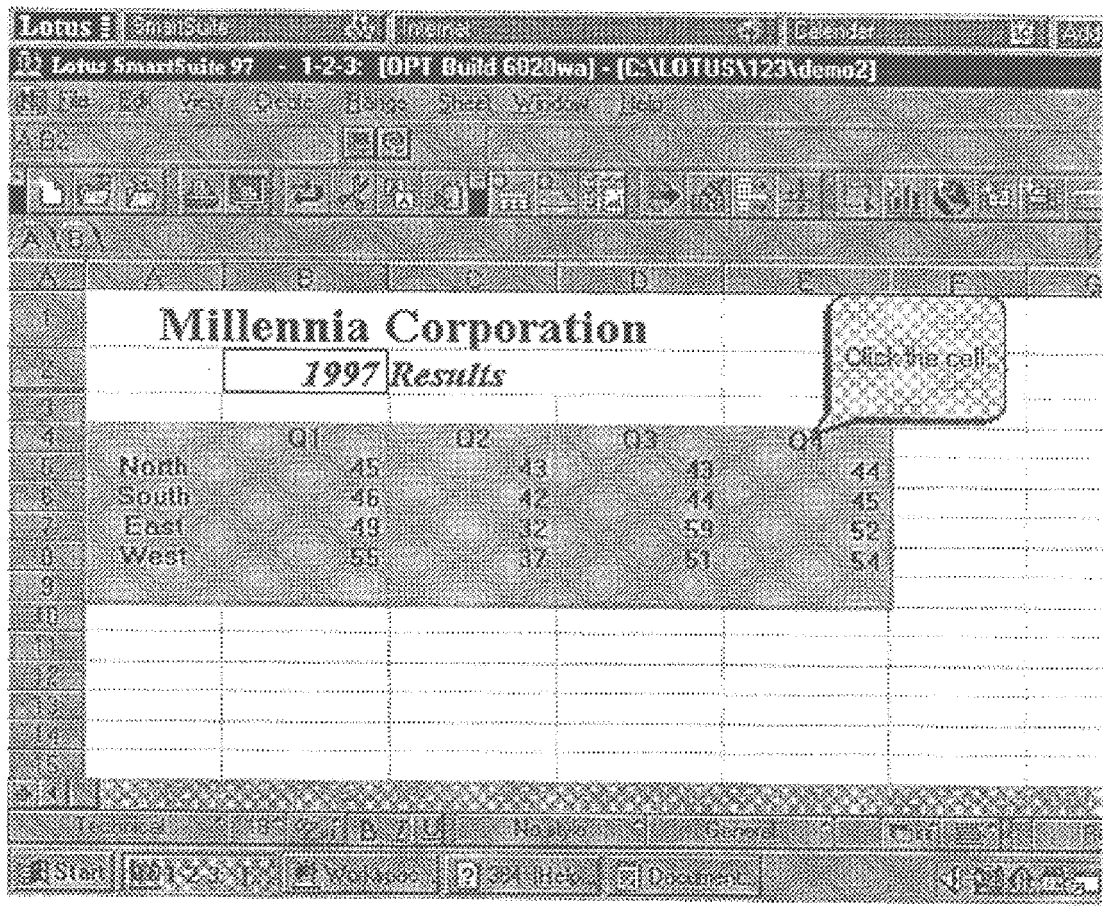
FIG. 9 is a screen shot of another step in the sample demonstration program in illustrated in FIG. 8.

FIG. 9 is a screen shot illustrating the next step in the demonstration which is generated when the user clicks the "Show demo" button in the "splash screen." As shown in FIG. 9, the demonstration player has located cell E4 by using a WhereIs( ) function call and has displayed the text for the first step in a text "bubble" positioned over that cell. Note that the text in the text bubble is the same as the text for the first step in the text based screen illustrated in FIG. 7.

Figure 10:
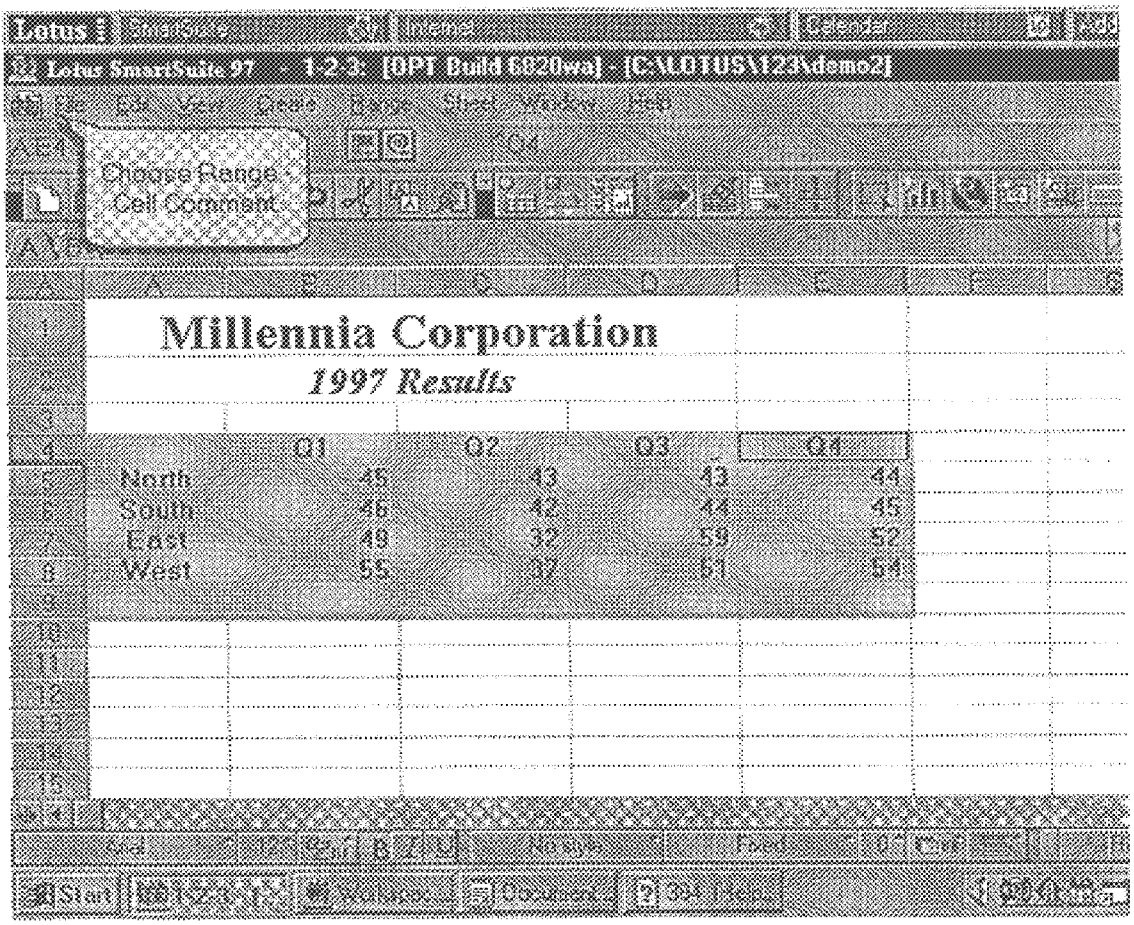
FIG. 10 is a screen shot of another step in the sample demonstration program in illustrated in FIG. 8.

FIG. 10 is a screen shot illustrating the next step in the animated demonstration program. Here the demonstration player has selected cell E4 and is displaying the text for the next step. Again, note that this text matches the text for the next step in the text based help topic system.

Figure 11:
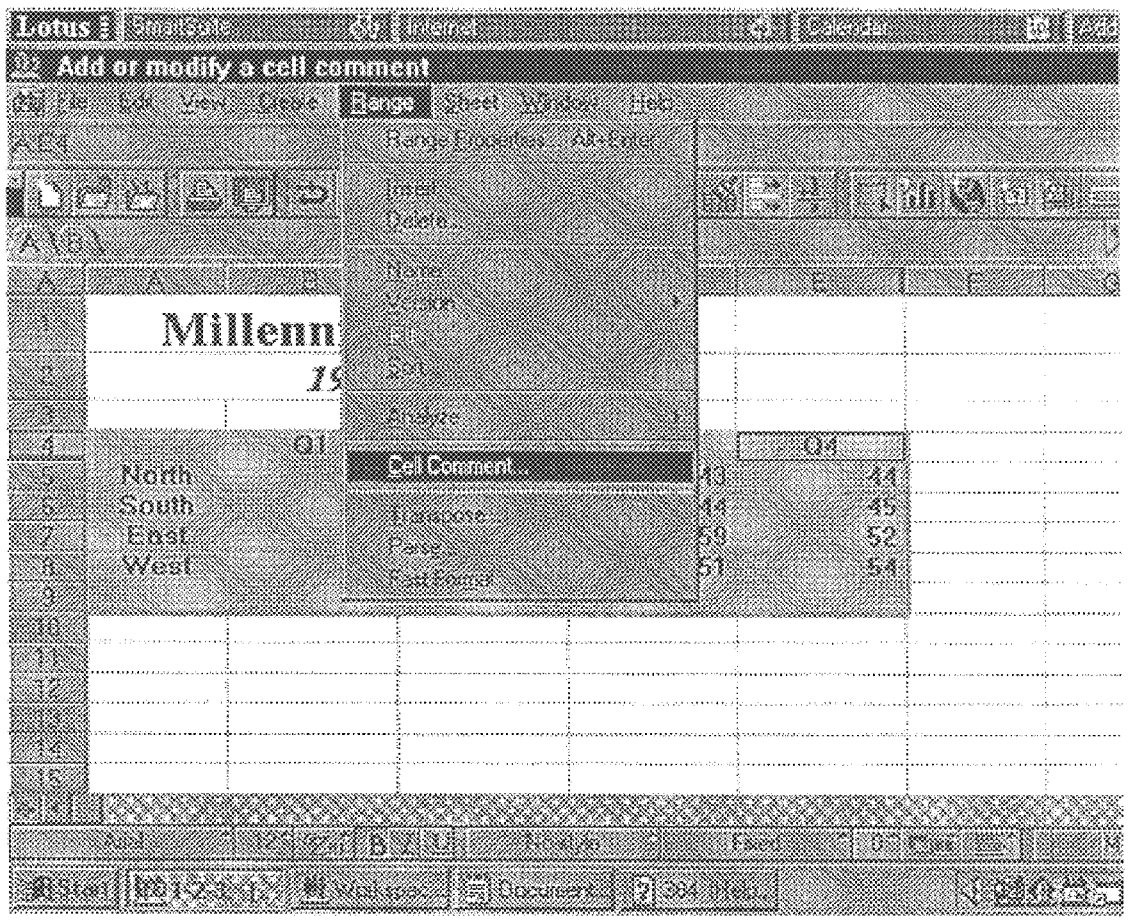
FIG. 11 is a screen shot of another step in the sample demonstration program in illustrated in FIG. 8.

In FIG. 11, the screen shot shows that the demonstration player has opened the menu to select the Range—Cell Comment command.

Figure 12:
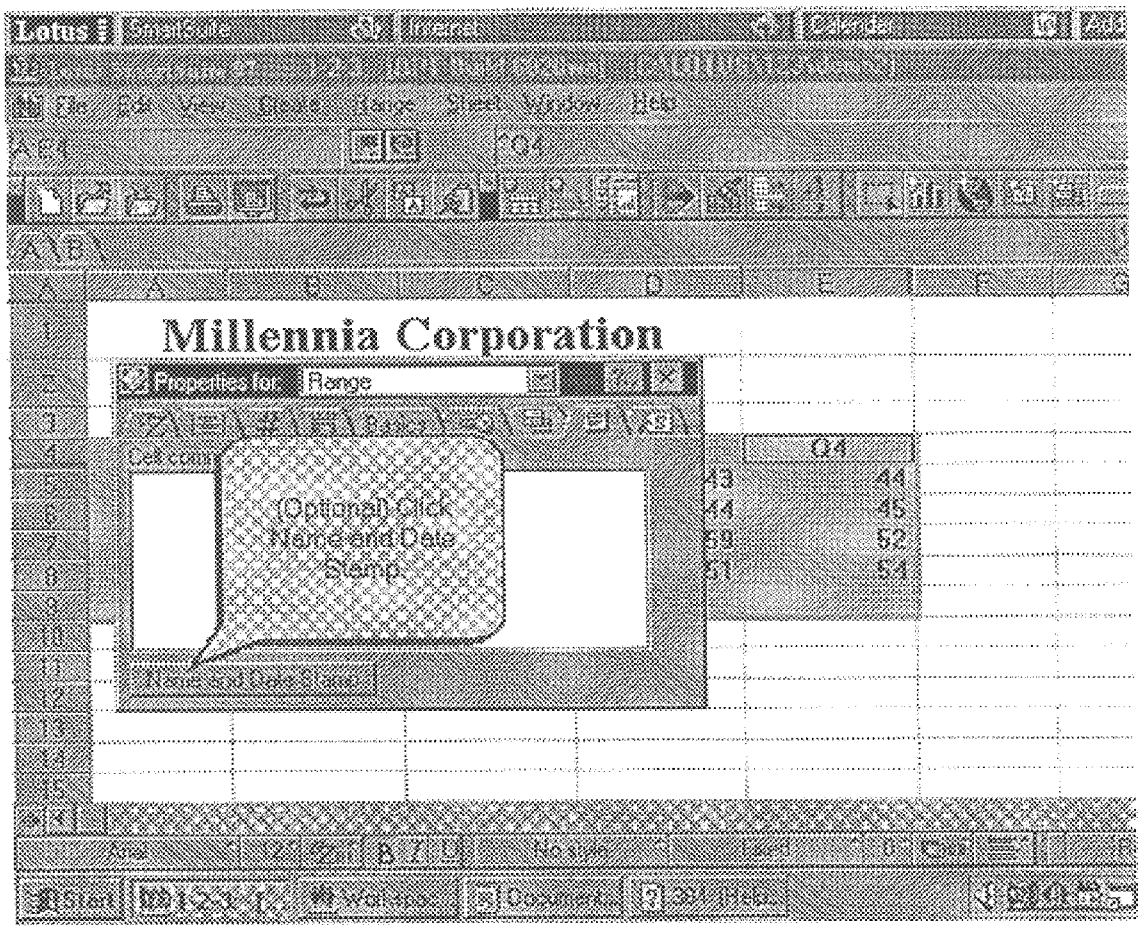
FIG. 12 is a screen shot of another step in the sample demonstration program in illustrated in FIG. 8.

Next, in FIG. 12, a screen shot shows the state of the demonstration after the demonstration player has selected the command Range—Cell Comment. In response to this selection, the spreadsheet application program has opened a properties box for the range E4. The demonstration player has also located the title bar to the properties box and has dragged the upper left corner of the box to cell A2, a location where the user can see both the properties box and the range E4.

Figure 13:
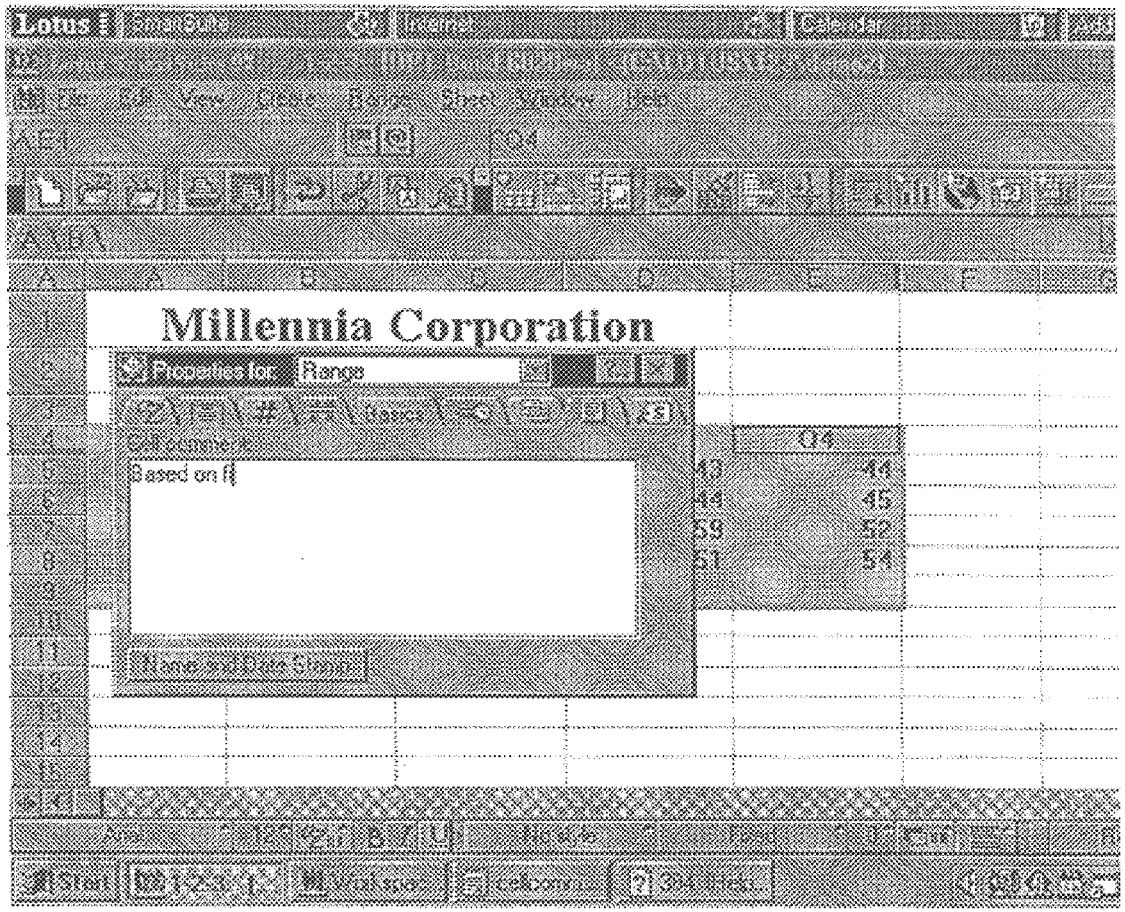
FIG. 13 is a screen shot of another step in the sample demonstration program in illustrated in FIG. 8.
Figure 14:
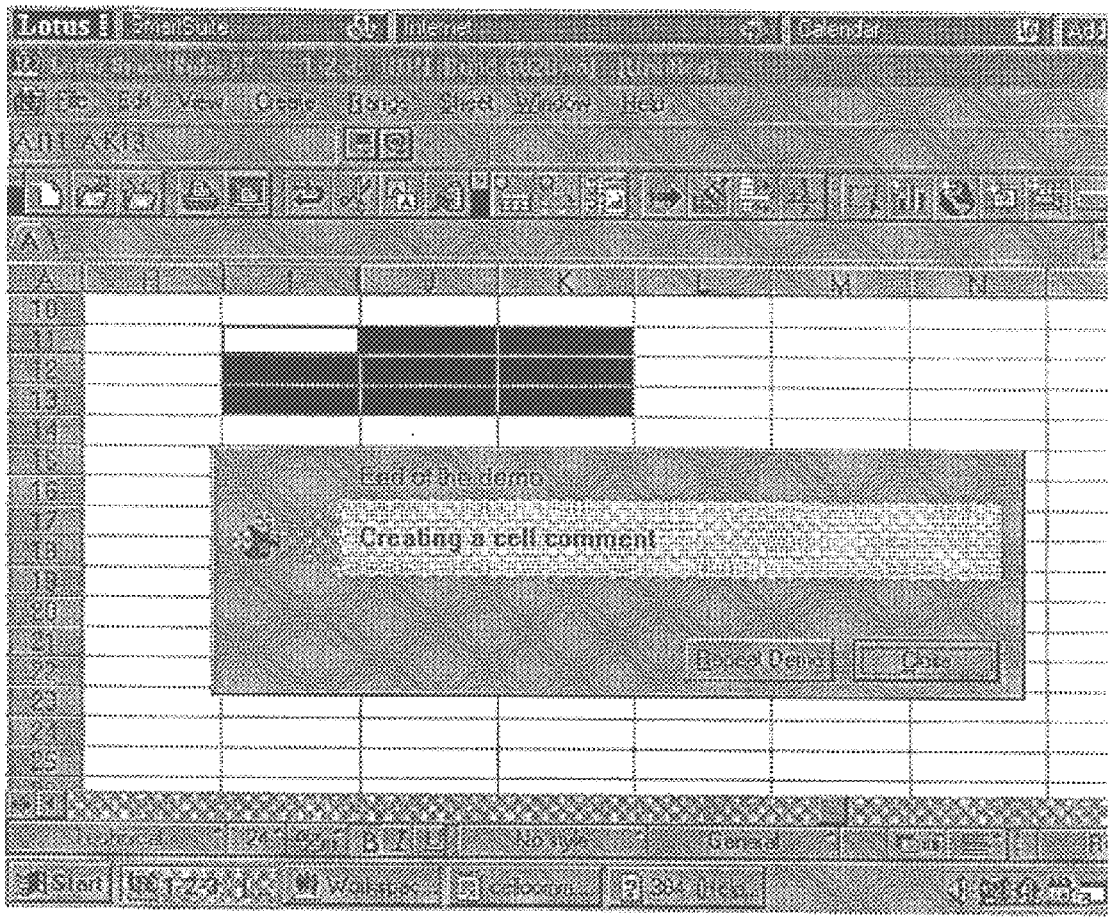
FIG. 14 is a screen shot of another step in the sample demonstration program in illustrated in FIG. 8.

Next, in FIG. 13, the demonstration player extracts sample text from a resource file and types the text into the cell comment field. Finally, as shown in FIG. 14, the demonstration as been completed and the demonstration player creates a final screen display to allow the user to either repeat the demonstration or to close the demonstration and return to the text based screen display.

In accordance with the operational description above it can be seen that the animated help demonstration system constructed in accordance with the principles of the present invention provides several important improvements. For example, the inventive demonstration system works by sending keyboard events (characters) and mouse events (clicks, double clicks, etc.) to an application program under the control of a script file. Consequently, the application program responds to these events just like it would respond to the user's keyboard and mouse input. Further, the application program starts with the user's desktop in the configuration it is when the user initiates the demonstration.

The common code in the demonstration player is very small and each animation requires only a small script file.

The demonstration player learns the location and windows handle of objects on the user's desktop by calling a product specific WhereIs( ) function. Therefore, the animation player can respond and run the demonstration correctly even if the user has customized his screen by moving items around.

Each step of an animated demonstration consists of determining the location of the object of interest, moving the mouse pointer to that screen location, and, in some cases, issuing a mouse event or keyboard event to the object's window. Any text displayed during that step is the same as that in the text-based help system. The result is that very little localization must be performed: when the product is localized and the Help system is translated, the demonstrations display in the local language on the localized version of the product without much additional effort. For example, since animated demonstrations generated by the inventive system do not rely on bitmaps to show the application program in various states, an entire series of bitmaps does not have to be re-shot to localize the product.

Although only one embodiment of the invention has been disclosed, it will be apparent to those skilled in the art that various changes and modifications can be made which will achieve some of the advantages of the invention without departing from the spirit and scope of the invention. These and other obvious modifications are intended to be covered by the appended claims.

What is claimed is:

1. Apparatus for use on a computer system having a display screen, a memory and user-controlled means for generating input commands, the apparatus suspending operation of an application program to generate an animated help demonstration on the display screen for teaching a user to operate a feature of the application program, the apparatus comprising:

a list of demonstration commands stored in the memory, the demonstration commands including program statements for detecting a customized desktop created by the user of the application program and the display screen at the time of suspension and for changing the list of demonstration commands to accommodate the application program customized desktop;

a demonstration player stored in the memory and responsive to the demonstration commands for generating input commands reflective of the customized desktop of the application program and the display screen at the time of suspension;

means for applying the input commands to the application program as simulated user input commands to cause the application program to perform a help demonstration starting with the customized desktop as it is displayed at the time of suspension; and a mechanism which resumes operation of the application program after the help demonstration ends.

2. Apparatus according to claim 1 wherein the list of demonstration commands comprises a script file.

3. Apparatus according to claim 1 wherein the demonstration player is responsive to the demonstration commands for communicating with the application program to determine the position on the display screen of a graphic image.

4. Apparatus according to claim 1 wherein the demonstration player is a software program running as a process separate from the application program.

5. Apparatus according to claim 1 wherein the memory has an address space within which the demonstration player runs and an address space within which the application program runs.

6. Apparatus according to claim 5 wherein the memory includes a global portion which is accessible by both the demonstration player and the application program and wherein the demonstration player communicates with the application program through the global memory portion.

7. Apparatus according to claim 1 further comprising error correcting code in the demonstration player which operates before the demonstration player generates input commands for changing the customized desktop of the application program and the display screen in order to prevent errors from occurring during the help demonstration.

8. Apparatus according to claim 1 further including a plurality of demonstration command lists and means responsive to a user command for selecting one of the demonstration command lists.

9. Apparatus according to claim 1 wherein the demonstration player includes means for preventing user commands from controlling the application program.

10. A method for use on a computer system having a display screen, a memory and user-controlled means for generating input commands, the method generating an animated help demonstration on the display screen for teaching a user to operate a feature of an application program, the method comprising the steps of:

A. storing a list of demonstration commands in the memory, the demonstration commands including position query commands and control commands;

B. suspending the operation of the application program;

C. using the position query commands to detect a customized desktop of the application program and the display screen at the time of suspension and to change the list of demonstration commands to accommodate the application program customized desktop;

D. applying the demonstration commands to a demonstration player to cause the demonstration player to generate input commands reflective of the customized desktop of the application program;

E. applying the input commands to the application program as simulated user input commands to cause the application program to perform a help demonstration; and F. resuming operation of the application program after the help demonstration ends.

11. A method according to claim 10 wherein step A comprises the step of:

A1. storing a script file in the memory.

12. A method according to claim 10 wherein step C comprises the step of:

C1. applying a position query command to the demonstration player to cause the demonstration player to communicate with the application program to determine the position on the display screen of a graphic image.

13. A method according to claim 10 wherein step C comprises the step of:

C2. running a demonstration player software program as a process separate from the application program.

14. A method according to claim 13 wherein step C comprises the step of:

C3. running the demonstration player software program in a first address space in the memory; and C4. running the application program in a second address space in the memory.

15. A method according to claim 14 wherein the memory includes a global portion which is accessible by both the demonstration player and the application program and wherein step D comprises the step of:

D1. causing the demonstration player to communicate with the application program through the global memory portion.

16. A method according to claim 10 wherein step D comprises the step of:

D2. changing the customized desktop of the application program and the display screen before applying the demonstration commands to the demonstration player in order to prevent errors from occurring during the help demonstration.

17. A method according to claim 10 wherein step A comprises the step of:

A2. storing a plurality of demonstration command lists in the memory; and the method further comprises the step of:

G. selecting one of the demonstration command lists in response to a user command.

18. A method according to claim 10 further comprising the step of:

H. preventing user commands from controlling the application program.

19. Apparatus for use on a computer system having a displays screen with a plurality of graphic control images displayed thereon, a memory and user-controlled means for generating input commands, the apparatus generating an animated help demonstration on the display screen for teaching a user to operate a feature of an application program, the apparatus comprising:

a script file containing a list of position query commands, control commands and program statements for detecting a customized desktops of the application program displayed on the display screen and for changing the list of commands of the script file to accommodate the application program customized desktop;

locating means stored in the memory and responsive to each position query command for passing information identifying one of the plurality of graphic control images, whereupon the application program returns information indicating a location on the display screen of the one graphic control image in the customized desktop;

control means stored in the memory and responsive to information returned from the application program and to a control command for generating input commands; and means for applying the input commands to the application program as simulated user input commands to cause the application program to manipulate the one graphic control image before the animated help demonstration is generated on the display screen.

20. Apparatus according to claim 19 further including a plurality of script files and means responsive to a user command specifying a particular demonstration for selecting one of the script files.

21. Apparatus according to claim 19 wherein the locating means and the control means comprise a software program running as a process separate from the application program.

22. Apparatus according to claim 21 wherein the memory has an address space within which the software program runs and an address space within which the application program runs.

23. Apparatus according to claim 22 wherein the memory includes a global portion which is accessible by both the software program and the application program and wherein the software program communicates with the application program through the global memory portion.

24. Apparatus according to claim 21 further comprising error correcting code in the software program for initializing the application program into order to prevent errors from occurring during the help demonstration.

25. Apparatus according to claim 21 wherein the software program includes means for preventing user commands from controlling the application program.

26. A computer program product for use on a computer system having a display screen with a plurality of graphic control images displayed thereon, a memory and user-controlled means for generating input commands, the computer program product generating an animated help demonstration on the display screen for teaching a user to operate a feature of an application program, the computer program product comprising a computer usable medium having computer readable program code thereon including:

a script file containing a list of position query commands, control commands and program statements for detecting a customized desktop of the application program displayed on the display screen and for changing the list of commands of the script file to accommodate the application program customized desktop;

program code responsive to each position query command for passing information identifying one of the plurality of graphic control images, whereupon the application program returns information indicating a location on the display screen of the one graphic control image in the customized desktop;

program code responsive to information returned from the application program and to a control command for generating input commands; and program code for applying the input commands to the application program as simulated user input commands to cause the application program to manipulate the one graphic control image before the animated help demonstration is generated on the display screen.

27. A computer program product according to claim 26 further including a plurality of script files and means responsive to a user command specifying a particular demonstration for selecting one of the script files.

28. A computer program product according to claim 26 wherein the locating means and the control means comprise a software program which will run as a process separate from the application program.

29. A computer program product according to claim 28 wherein the memory has an address space within which the software program runs, an address space within which the application program runs and a global portion which is accessible by both the software program and the application program and wherein the software program includes means for communicating with the application program through the global memory portion.

30. A computer program product according to claim 28 further comprising error correcting code in the software program for initializing the application program into order to prevent errors from occurring during the help demonstration.

31. A computer program product according to claim 28 wherein the software program includes means for preventing user commands from controlling the application program.

* * * * *